US008874734B1

(12) United States Patent
Straz

(10) Patent No.: US 8,874,734 B1
(45) Date of Patent: Oct. 28, 2014

(54) ENHANCED ZIGBEE MESH NETWORK WITH DORMANT MODE ACTIVATION

(75) Inventor: Ronald Straz, Annandale, VA (US)

(73) Assignee: GlobalTrak, LLC, Dulles, VA (US)

(*) Notice: Subject to any disclaimer, the term of this patent is extended or adjusted under 35 U.S.C. 154(b) by 152 days.

(21) Appl. No.: 13/346,624

(22) Filed: Jan. 9, 2012

Related U.S. Application Data

(60) Provisional application No. 61/431,034, filed on Jan. 9, 2011.

(51) Int. Cl.
G06F 15/173 (2006.01)

(52) U.S. Cl.
USPC ............ 709/224; 709/200; 709/202; 709/223

(58) Field of Classification Search
USPC .................................. 709/202, 200, 223, 224
See application file for complete search history.

(56) References Cited

U.S. PATENT DOCUMENTS

| 7,663,502 | B2* | 2/2010 | Breed ........................ 340/12.25 |
| 8,054,203 | B2* | 11/2011 | Breed et al. ................... 340/931 |
| 8,509,790 | B2* | 8/2013 | Christensen et al. ......... 455/450 |
| 2006/0167971 | A1* | 7/2006 | Breiner ......................... 709/202 |
| 2006/0291657 | A1* | 12/2006 | Benson et al. ................. 380/270 |
| 2007/0138274 | A1* | 6/2007 | Saperstein et al. ............ 235/385 |
| 2007/0195808 | A1* | 8/2007 | Ehrlich et al. ................. 370/408 |
| 2008/0268896 | A1* | 10/2008 | Langlois et al. ........... 455/550.1 |
| 2009/0290512 | A1* | 11/2009 | Twitchell, Jr. ................ 370/254 |
| 2010/0067420 | A1* | 3/2010 | Twitchell, Jr. ................ 370/311 |
| 2010/0141435 | A1* | 6/2010 | Breed ..................... 340/539.13 |
| 2010/0214061 | A1* | 8/2010 | Twitchell et al. ............ 340/5.61 |
| 2011/0080267 | A1* | 4/2011 | Clare et al. ................... 340/10.4 |
| 2012/0075139 | A1* | 3/2012 | Gagnon et al. ........... 342/357.29 |

* cited by examiner

Primary Examiner — Anthony Mejia

(57) ABSTRACT

A system, apparatus, and method for managing energy conservation in a mesh network of smart container monitoring system is provided. The monitoring unit and the monitored devices within each smart container form a first-tier network, and the smart containers in vicinity are wirelessly connected to form a second-tier mesh network. Each tier of network awakens per a defined procedure to allow for establishment of communication for a short amount of time.

7 Claims, 3 Drawing Sheets

ENHANCED ZIGBEE MESH NETWORK WITH DORMANT MODE ACTIVATION

CROSS-REFERENCE TO RELATED APPLICATIONS

The present invention claims priority to U.S. Provisional Application No. 61/431,034, filed Jan. 9, 2011, the entirety of which is incorporated by reference herein.

BACKGROUND OF THE INVENTION (1) Field of the Invention

The present invention relates generally to container security and, more particularly, to a container security system in which containers are wirelessly linked in a mesh network with a configurable dormant mode to conserve power consumption.

(2) Background Art

In today's security conscious transportation environment, there is a strong need to cost-effectively and accurately monitor the contents of containerized shipments. This need exists both in the United States and abroad. The present assignee has provided a solution to meet this need which is the subject of U.S. Pat. No. 7,098,784 entitled, "System and Method for Providing Container Security." This patent is hereby incorporated by reference in its entirety.

In further developing and implementing its patented design, SPC has discovered important and unforeseen advantages in a novel system and method for enabling communications within and between secured containers. This novel system and method enables containers to communicate and report their status over longer ranges while conserving battery power.

BRIEF SUMMARY OF THE INVENTION

The present invention incorporates a multiple-level dormant mode activation method into a two-tier network structure. A first-tier network integrates wired/wireless sensors with their monitoring units. Discrete sensors monitoring a secured container are linked and bound to the container unit through the use of a star network, extended star network, or similar network configuration. Typically the monitoring system in each container forms a first-tier network. According to a preferred embodiment of the present invention, the wireless technology for the first-tier network preferably uses a communication protocol such as the ZigBee protocol based on the IEEE 802.15.4 standard for wireless personal area networks (WPANs), which is incorporated by reference herein.

The second-tier is a wireless link among multiple containers in vicinity. Further in accordance with a preferred embodiment, such a network is preferably designed to allow for mobile or ad-hoc configurations (such as a mesh network). Using this system, buried or obstructed container systems (extended communications not available) may be able to communicate and gain access to a satellite or cellular link (extended communications) through a neighboring container device. According to a preferred embodiment of the present invention, the wireless technology for the second-tier mesh network preferably uses a communication protocol such as the ZigBee protocol. The wireless technology for the second-tier network may be same as or different from the wireless technology for the first-tier network.

According to the present invention, the first-tier network and the second-tier network are coordinated in a completely mobile configuration, where all monitoring devices spend the majority of their time in a sleep mode. Each tier of the network preferably awakens per a defined procedure to allow for establishment of communication for a short amount of time, then goes back to sleep. This procedure is required due to the fact that as a completely mobile system there is limited energy (battery) available to the monitoring units to perform their functions. When used within a larger container monitoring system, the present invention, hereafter referred to as the "Sleepy ZigBee-Mesh network," this system offers important advantages over the prior art.

According to a preferred embodiment, the monitoring system in each container is a first-tier local star network, which consists of a single monitoring unit (router/coordinator) and multiple end nodes (typically sensors); a plurality of routers and coordinators are connected to form a larger mesh network. One or more monitoring systems within the mesh are assigned as the coordinators. The other monitoring systems are called routers. The coordinators assign themselves when an extended communication option is available, for example the top container in a stack associated with a sea going ship. The routers automatically connect to an accessible coordinator through other routers or directly.

According to a particular configuration of dormant mode activation, the first-tier local star network runs on a configurable, self-healing beacon (typically 4 minutes) with a wake time of under 1 second per beacon interval. The second-tier mesh network is activated on a configurable interval with respect to 12 midnight UTC. Typically this interval is 12 hours, causing the mesh network to wake at 12 noon and 12 midnight UTC. Global Positioning Satellite (GPS) time in concert with a low drift Real Time Clock (RTC) keep the monitoring units synchronized. Between GPS fixes, the RTC keeps the times synchronized. The mesh network remains awake for a configurable time period to ensure every node has ample time to enumerate the network and transmit data.

This Sleepy ZigBee Mesh network concept and method for use are illustrated in the figures below. The accompanying drawings, which are incorporated in and constitute part of the specification, illustrate various embodiments of the present invention and together with the description, serve to explain the principles of the present invention.

DETAILED DESCRIPTION OF THE INVENTION

Figure 1:
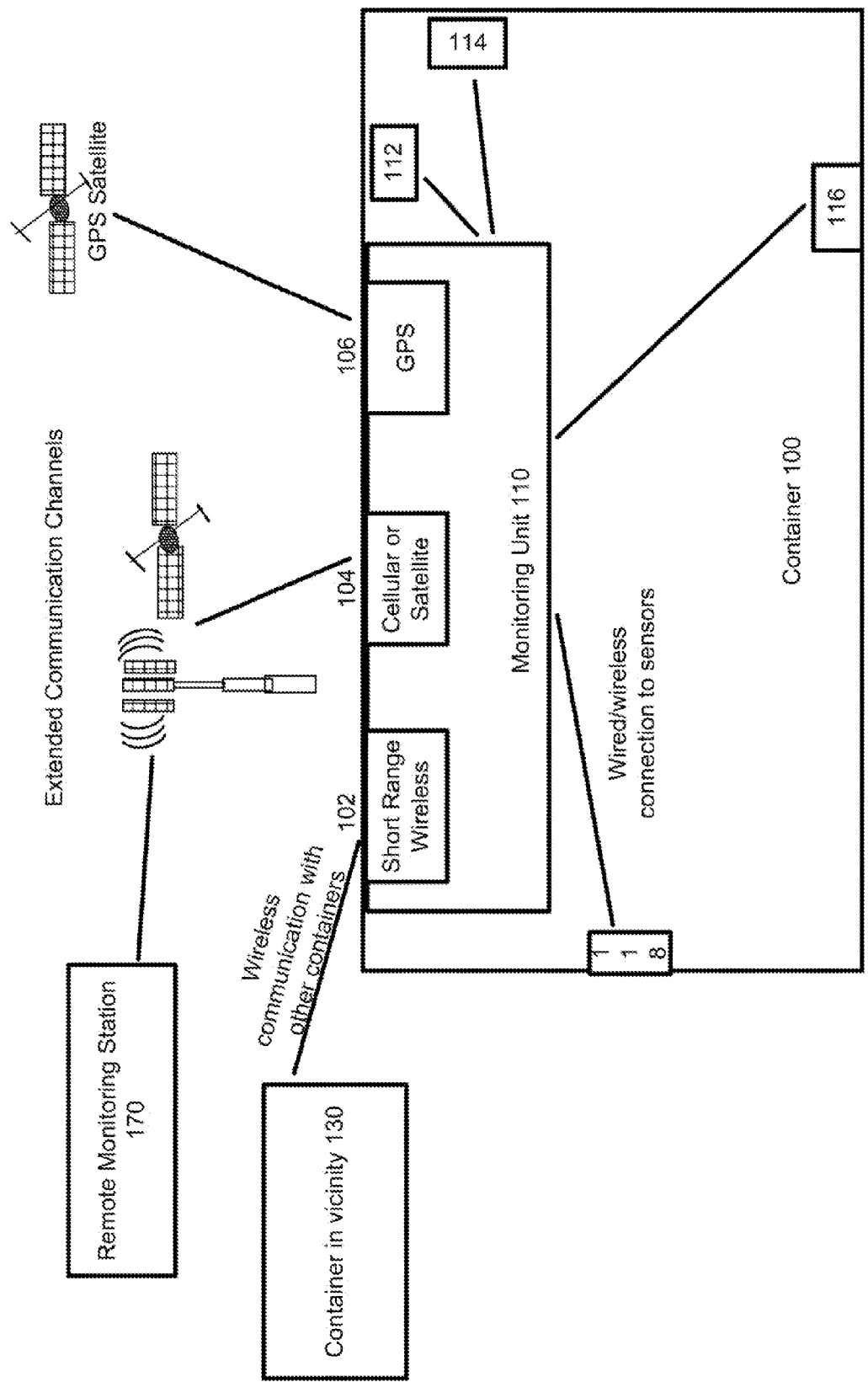
FIG. 1 shows a functional configuration of the various communication channels in an intelligent container according to an embodiment of the invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

With reference now to FIG. 1, a functional configuration in accordance with an embodiment of the present invention discussed. As shown in FIG. 1, and for the purpose of explanation, an intelligent container communication system of the present invention is shown including three major communications sub-systems: a short range wireless communication sub-system 102; a cellular communications channel, a satellite communications channel, or other long range wireless communications channel 104; a GPS sub-system 106. Ideally, these communication subsystems along with a microcontroller will be generally housed within a single unit, however, these element may also be made up of separate functional units under common control. Preferably, each communication subsystems along with a microcontroller will form a monitoring unit 110 for each container. Sensors and other security devices 112-118 may be connected to the monitor unit 110 using wired and/or wireless connections. In a preferred embodiment, the short range wireless communication sub-system 102 will use a ZigBee wireless interface for both the communications with wireless sensors within the container and for communications with other containers which are within a short range.

Figure 2:
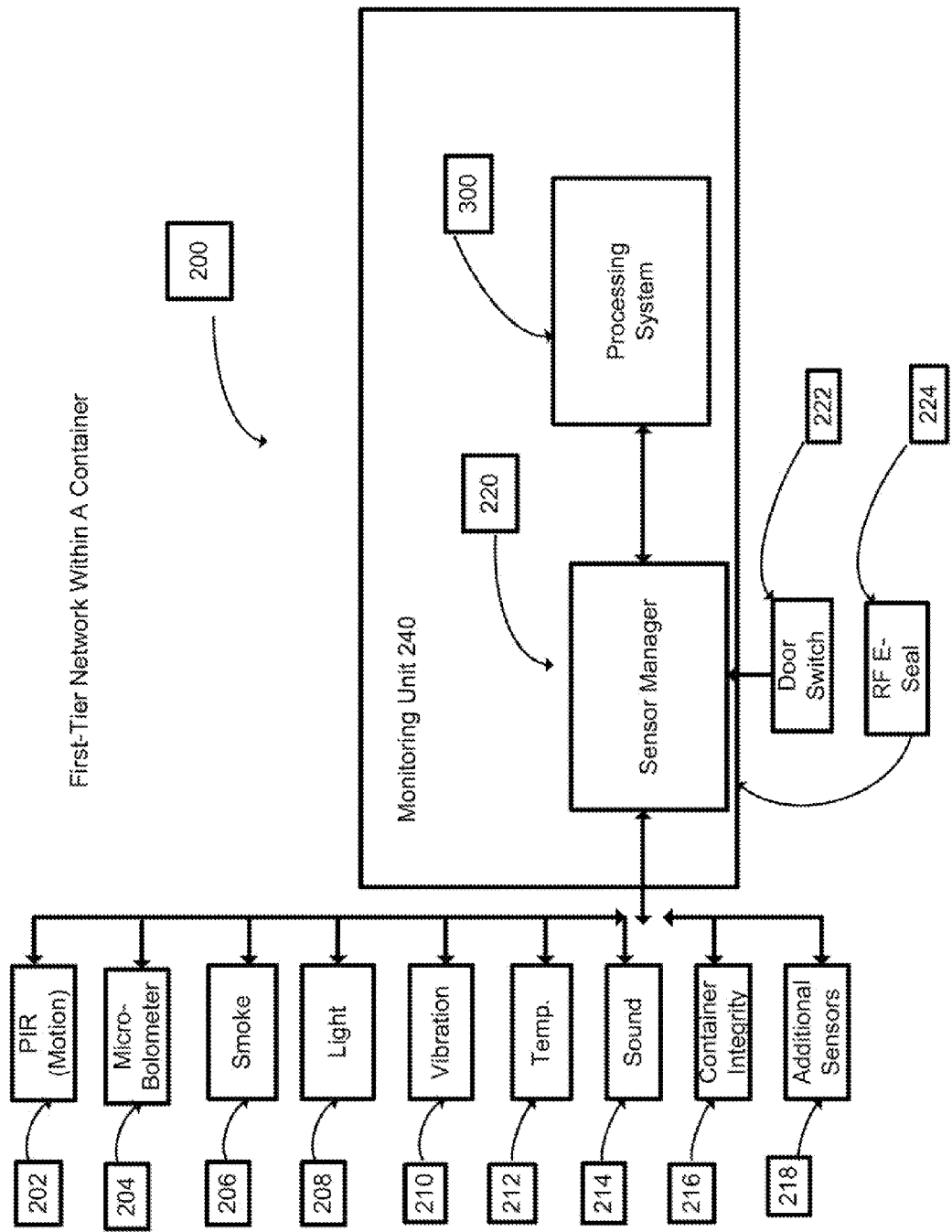
FIG. 2 shows a functional configuration of the monitoring system within an intelligent container.

With reference now to FIG. 2, a functional configuration of the monitoring system in accordance with a preferred embodiment of the present invention is illustrated. As provided, system 200 shows a first-tier network which integrates wired/wireless sensors with a monitoring unit 240. As further shown in FIG. 2, the sensing system preferably further includes a set of sensors chosen to give an accurate and comprehensive view of the container environment. In accordance with a preferred embodiment, these sensors preferably include: a motion sensor 202; a microbolometer 204; a smoke detector 206; a light sensor 208; a vibration sensor 210; a temperature sensor 212; an auditory (sound) sensor 214; a container integrity sensor 216, a door switch sensor 222, and other additional sensors. Discrete sensors monitoring a secured container are preferably linked and hound to the container monitoring unit through the use of a star network, extended star network, or similar network configuration.

In a further preferred embodiment of the monitoring unit 240, the sensor manager 220 may be implemented using a ZigBee module, and the dormant mode activation and wakeup of the first tier network may be managed by the sensor manager 220 without waking up the processing system 300. The processing system 300 may manage the dormant mode activation and wakeup tasks in the second tier network without interrupting the current status of the first tier network managed by the sensor manager 220.

Figure 3:
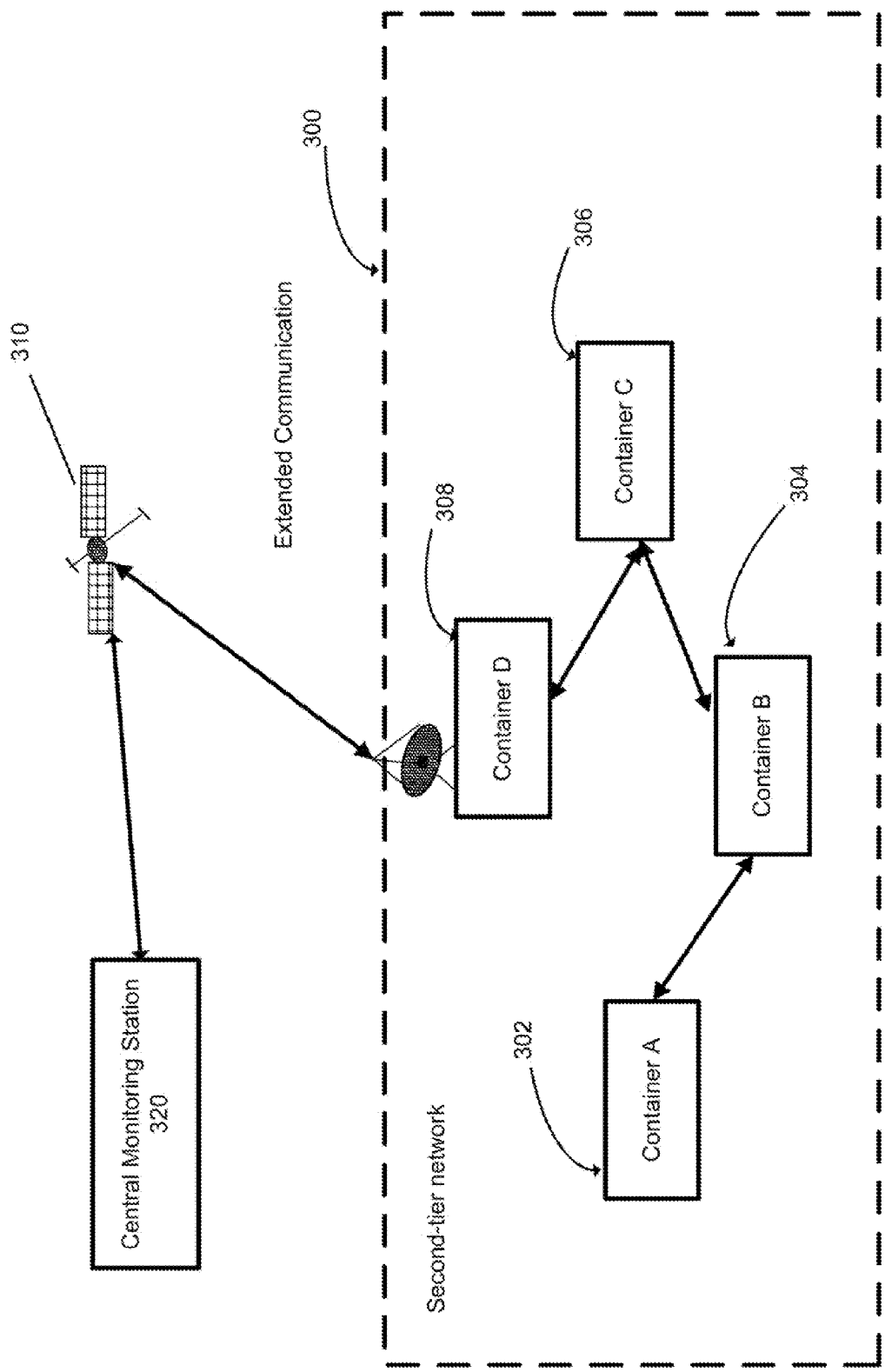
FIG. 3 shows multiple containers operating in an ad-hoc network configuration.

As shown in FIG. 3, according to a preferred embodiment, a second-tier network for use with the present invention is preferably provides a wireless link among multiple containers in a given vicinity. Preferably, the present invention utilizes the short range wireless channel to provide a communications path between multiple containers, such that if any given container is unable to communicate with a central monitoring station 320 through an extended cellular or satellite channel, a communications path may be established through one or more successive connections between individual containers. For example, as shown in FIG. 3, container A 302 is routed to container B 304. Container B 304 may then act as a relay and route the information originally sent from container A 302 to container C 306, and on to container D 308. Thereafter, container 308 may access to satellite link which may then be used to transmit the information through a satellite 330 to a central monitoring station 320. Alternatively, other uplink channels and devices may be used. For example, a cellular channel or the like could be used. Further, an embodiment of the present invention preferably utilizes ad-hoc dynamic routing algorithms on the short range wireless channel to provide a method of establishing connections between the containers 302, 304, 306, and 308. Preferably, these algorithms utilize routing and assignment techniques that determine the best routing configuration for any given arrangement of nodes (in this case cargo containers). Further, the typical network topology for the second-tier network is preferably a mesh network.

According to the present invention, the first-tier network and the second-tier network are preferably coordinated in a completely mobile configuration, where all monitoring devices spend the majority of their time in a sleep mode. Each tier of the network preferably awakens per a defined procedure to allow for establishment of communication for a short amount of time, then goes back to sleep. This procedure is required due to the fact that as a completely mobile system there is limited energy (battery) available to the monitoring units to perform their functions.

The present invention is particularly suitable for monitoring containers being transported on ocean going vessels. For the purpose of explanation, a container according to a preferred embodiment is preferably equipped with following communications subsystems: a ZigBee wireless interface for short range communications among containers and for the wireless sensors within each container; a general packet radio service (GPRS) device for extended communications with the remote monitoring station; and a GPS enabled device for acquiring time and location information. In operation, the container monitoring unit in the "Sleepy ZigBee-Mesh Network" preferably spends the majority of the time in a sleep mode. From this state, the container monitoring unit may awaken according to configurable intervals. In accordance with a preferred embodiment, it is preferred that two intervals are used. In this arrangement, the first configurable interval is preferably for handling tasks in the first-tier network, for example, polling sensor status, reading sensor alarms, generating messages, and queuing messages for later transmission. The second configurable interval is preferably for handling tasks in the second-tier network, for example, waking up the ZigBee Mesh Network, transmitting queued messages, handling extended communications with the remote monitoring station, and handling GPS tasks.

According to a particular configuration of dormant mode activation, the first-tier local star network preferably runs on a configurable, self-healing beacon of several minutes interval (typically 4 minutes) with a wake time of under 1 second per beacon interval. With this mode, the second-tier mesh network is preferably activated on a configurable interval with respect to 12 midnight UTC. The length of this interval is flexible. According to the length of a particular trip, the battery capacity, and other monitoring factors, the second-tier mesh network may be configured to wake up once every hour, once every four hours, or twice per day. Typically this interval would be 12 hours which would cause the mesh network to wake at 12 noon and 12 midnight UTC. Preferably, Global Positioning Satellite (GPS) time in concert with a low drift Real Time Clock (RTC) will be used to keep the monitoring units synchronized. According to a preferred embodiment, the mesh network preferably will be configured to stay awake for a configurable time of 15 s of enumeration time plus RTC drift for the longest expected time between GPS fixes.

Communication System

In accordance with a preferred embodiment of the present invention, the reporting may be made via a wireless connection to a satellite mode to communicate with a satellite system such as Globalstar™ or Orbcomm™. Preferably, such a satellite device will be a device such as the Axxon™, AutoTracker™, or the like, or a customized Orbcomm™ VHF satellite GPS tracking communications device which may be adapted with ZigBee™ interface antenna devices to incorporate them into the overall LAN architecture of the security system; these devices include a satellite transceiver, GPS receiver, a customized ZigBee™ wireless antenna with a serial (Ax Tracker™) or duplex (OrbComm™) interface.

In accordance with an alternative preferred embodiment of the present invention, the reporting may also be made using a wireless system independent from the satellite system. One example of such wireless system is the GSM cellular system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the ZigBee™ (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

As referred to above, all communications of the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from present invention as needed. For example, as detailed above, each system and subsystem of the present invention may be designed to send, receive, report and request information via the wireless and/or satellite systems so as to continually maintain and update the container systems.

Additional communications with the communications manager are preferably enabled via industry standard wired interfaces, with communications protocols implemented in firmware for future upgrade. These interfaces preferably will include at least two RS-322 compatible serial ports. These alternate serial ports may assist the communications manager to interface with additional remote sensors as well as other local reader/controllers such as an RFID reader or other devices.

Remote Monitoring

To support and monitor the dataflow generated by the present invention, it is preferred that users establish a centralized location to collect and analyze data. This central location or "data fusion center" would preferably consolidate all tracking signals, sensor alarms and reports generated by the monitoring systems and provide further context and links with current intelligence.

Preferably, such a data fusion center will receive such source information in a variety of formats such as Electronic Data Interchange, XML, E-mail, Short Message Service (SMS), HTML and flat text Files. After receiving such data, the data fusion center preferably would act to process information to identify anomalies. With this data collected and processed, analyst may calculate statistics and probability of detection models used for decision support. In short, such a data fusion center would preferably provide a consolidated source of information that could be used to assist agencies and shippers.

What is claimed is:

1. A two-tier network system for managing communications among a plurality of shipping containers, the system comprising:

a first-tier network for monitoring communications within a single container, wherein the first-tier network comprises a plurality of monitoring units within the monitored container, wherein the monitoring units comprise a sensor, a sensor manager and a processing unit, further wherein the monitoring units are wirelessly linked to one another, and further wherein at least one monitoring unit is assigned as a coordinating monitoring unit which queries and coordinates activities among the plurality of monitoring units, further wherein the role of the coordinating monitoring unit may be switched between the plurality of monitoring units; and a second-tier network for coordinating communications between a plurality of containers monitored with first-tier networks, wherein the coordinating monitoring units in each of the plurality of monitored containers is a node of the second-tier network;

wherein the first-tier network is configured to work in a first sleep mode which is managed by the coordinating monitoring unit, wherein the sensor manager of the coordinating monitoring unit manages the wake up and sleep mode activities of the coordinating monitoring unit without waking the processing unit of coordinating monitoring unit; and the second-tier network is configured to work in a second sleep mode, wherein the second sleep mode is managed by a coordinating monitoring unit.

2. The system of claim 1, wherein the second sleep mode is independent from the first sleep mode.

3. The system of claim 1, wherein the first-tier network is a star network or an extended star network.

4. The system of claim 1, wherein the first-tier network is configured to be awakened on a first configurable interval and stay awake for a first configurable period.

5. The system of claim 1, wherein during the awake period of the first-tier network, the coordinating monitoring unit is capable of polling the status of the multiple devices and creating messages to be transmitted later.

6. The system of claim 1, wherein the second-tier network is configured to be awakened on a second configurable interval and at a time with respect to Coordinated Universal Time.

7. The system of claim 1, wherein the monitoring units are configured to update GPS information during an awake period of the second-tier network.

* * * * *